April 30, 1946. N. E. WAAG 2,399,525
QUICK DISCONNECT COUPLING
Filed Dec. 4, 1943 2 Sheets-Sheet 1
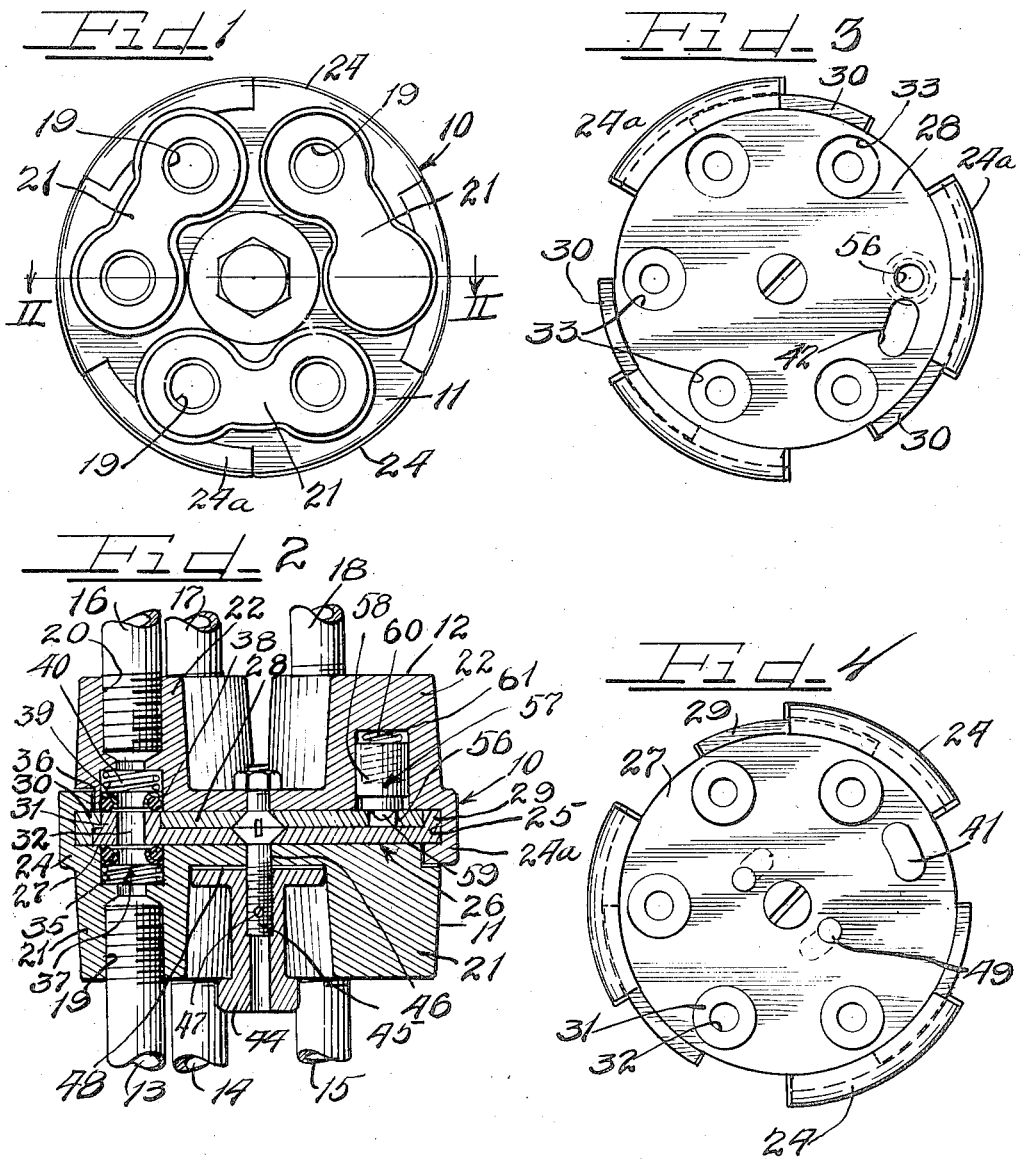
Inventor
Norman E. Waag
by Charles T. Hill Attys.

April 30, 1946. N. E. WAAG 2,399,525
QUICK DISCONNECT COUPLING
Filed Dec. 4, 1943 2 Sheets-Sheet 2
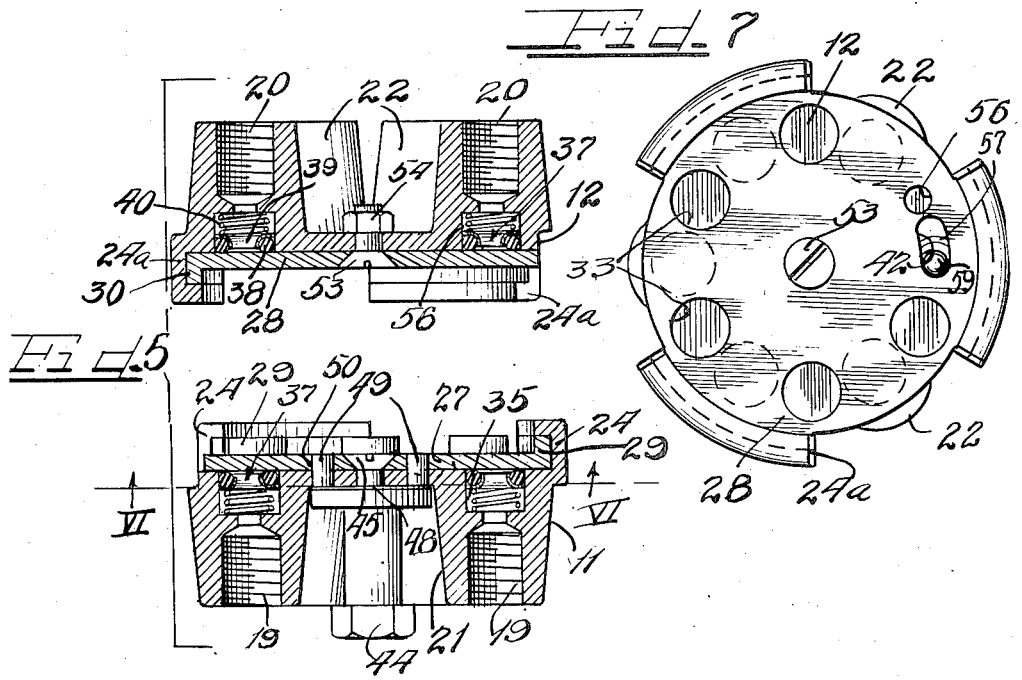
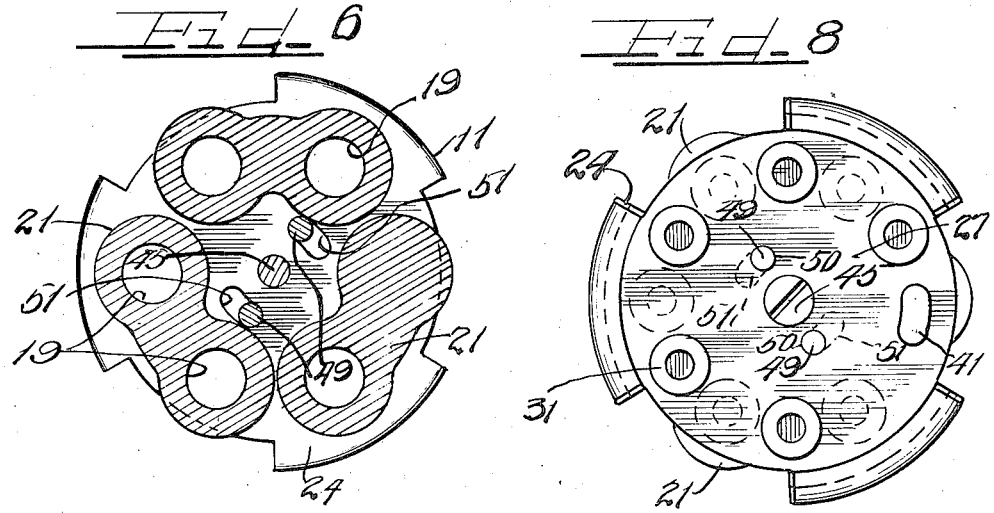
Inventor
Norman E. Waag.
by Charles H. Hills Attys.

Patented Apr. 30, 1946

2,399,525

UNITED STATES PATENT OFFICE 2,399,525

QUICK DISCONNECT COUPLING

Norman E. Waag, Cleveland, Ohio, assignor to Thompson Products, Inc., Cleveland, Ohio, a corporation of Ohio Application December 4, 1943, Serial No. 512,861

14 Claims. (Cl. 284—11)

This invention relates to a fast sealing quick disconnect coupling adapted for quick and easy operation while automatically sealing each coupling part when said coupling is disconnected and the parts are detached from each other.

More particularly, the present invention relates to a device for coupling together the ends of fluid conduits, such, for example, as tubes, pipes, hoses and the like, to place the same in unrestricted communication when coupled together and to seal the ends thereof when uncoupled.

According to the present invention, a pair of complimentary coupling parts or boxes are connected to the ends of fluid conduits which are to be placed in unrestricted fluid flow communication. A shiftable member comprising a plurality of parts is provided to detachably connect the coupling boxes together and to control fluid flow between the fluid conduits which are connected to the boxes. Each of the coupling boxes is provided with a part of the valve member which is retained by the box for sealing the box when the coupling is disconnected so as to prevent leakage or drainage of the fluid from the end of the disconnected fluid conduit.

The valve member of the coupling unit of the present invention may advantageously take the form of a rotatably mounted member made up of a pair of interfitting plates which are adapted to cooperate with a plurality of mating peripheral portions on each of the coupling boxes so as to connect the boxes together. One of the plates comprising the valve member is adapted to be retained by each of the boxes when they are detached. By virtue of the mating peripheral portions of the two coupling boxes, there is formed a substantially cylindrical chamber therebetween, which accommodates the rotatably mounted valve member. Means are also provided in one of the coupling boxes to aid in maintaining the position of the valve part with respect to that coupling box when the coupling unit is properly connected for fluid flow between the conduits.

It is, thus, an object of the present invention to provide a detachable coupling unit for interconnecting a plurality of conduits having a valve member therein for placing the coupling boxes comprising the unit in fluid flow communication and for sealing each coupling box when the coupling is broken.

It is another object of the present invention to provide a quick disconnect coupling having a pair of boxes each of which embodies a plurality of ports spaced from the center of said box with which is associated a valve member having means disposed centrally of and accessible from the exterior of the boxes to shift the valve member to couple the boxes together with the ports thereof in direct fluid flow communication.

A further object is to provide a coupling for joining conduits in fluid flow communication and for sealing the conduits in uncoupled relation wherein coupling parts receive one or more conduits at points outwardly from the axial centers thereof and rotatably support valve members at their axial centers.

Another and further object of the present invention is to provide a coupling unit which is composed of interchangeable coupling boxes and valve members of substantially similar construction thereby not only simplifying the manufacture but reducing the repair and replacement parts required to a minimum.

A still further object of the present invention is to provide a coupling unit in which the valve member has associated therewith means for shifting the position of said valve member from port covering to port uncovering relation.

Another and further object of the present invention is to provide a coupling unit in which the valve members are made up of a multiple number of parts at least one of which defines an unrestricted passageway extending through the several parts thereof for carrying fluid between the interconnecting conduits to which the coupling boxes are secured without the necessity of providing sealing means between the valve parts.

Another and still further object of the present invention is to provide a valve member which is rotatably shiftable on the cooperating coupling boxes, said valve member being made up of a plurality of mutually interfitting parts, the cooperative portions of which coact with means provided in or on the coupling boxes to hold each of the parts of the valve member in sealing relation in its associated coupling box when the coupling is disconnected and to lock the unit together when it is connected.

It is a still further object of the present invention to provide a quick disconnect coupling unit for a multiple number of conduits which is simple in design, possesses all of the foregoing attributes and yet is low in cost but high in functional efficiency.

Still other features and objects of the invention will be apparent as the detailed description of the annexed sheets of drawings which illustrate a preferred embodiment of the invention proceeds.

On the drawings:

Figure 1 represents a plan view of one form of quick disconnect coupling unit which embodies the principles of the present invention;

Figure 2 is a cross-section of the coupling unit taken along the line II—II in Figure 1;

Figure 3 is an internal view of one of the coupling boxes and its associated valve parts disposed in a position therein corresponding to that which they assume when the coupling boxes are in coupled relation;

Figure 4 is an internal view of the other of the coupling boxes of the coupling unit and corresponds generally to Figure 3 of the drawings;

Figure 5 is a cross-section of the coupling unit of the present invention in disassembled relation;

Figure 6 represents a cross-section of one of the coupling parts illustrated in Figure 5 as seen from the line VI—VI therein; and Figures 7 and 8 represent end views of each of the coupling boxes comprising the coupling unit illustrated in Figure 1 in disassembled and sealed relation.

As shown on the drawings:

For the purpose of illustrating the principles of the present invention, attention is directed to Figures 1 and 2 in which is illustrated a coupling unit 10 which represents a preferred embodiment of the invention.

The coupling unit 10 comprises a pair of coupling boxes 11 and 12 which are adapted to interconnect, in the manner hereinafter described, a plurality of fluid conduits 13, 14 and 15 with a corresponding number of conduits 16, 17 and 18, respectively, each of which may be threaded or otherwise suitably secured to the ports 19 and 20 provided in the coupling boxes 11 and 12, respectively (see Figure 2). The coupling boxes 11 and 12 are preferably substantially identical in construction and design, however, one of the boxes may be provided with mounting means (not shown) such, for example, as a plurality of drilled and tapped holes in the body of the coupling box by means of which the coupling unit may be mounted in the apparatus with which it is to be employed.

The coupling unit of the present invention is adapted to accommodate several, in this case, five, conduit connections which may be grouped or arranged in any satisfactory manner such as that illustrated in Figure 1 on the drawings. The ports 19 are advantageously formed in the raised bosses 21 which my be fabricated as an integral part of the coupling box 11. Similarly, the bosses 22 are integrally formed as a part of the coupling box 12 and accommodate a plurality of ports 20 therein.

The coupling boxes 11 and 12 are provided with a plurality of prong-like fingers 24 and 24a, respectively, which are advantageously formed integrally with and adapted to project substantially radially from the outer periphery of said coupling boxes. As will be apparent from Figures 5, 7 and 8 on the drawings, the several fingers 24, 24a of coupling boxes 11 and 12, respectively, cooperate to enclose a substantially cylindrical chamber 25 when said coupling boxes 11 and 12 are disposed in assembled relation. As will best be understood from Figure 2, the chamber 25 is substantially completely enclosed to receive the valve member 26 therein in rotatable relation.

The valve member 26 is preferably made up of a plurality of interfitting parts, in this instance, comprising the plates 27 and 28. The plate 27 is substantially circular and is provided with a plurality of peripherally disposed flanged portions 29 which may advantageously be formed integrally with the body of the plate and are disposed in spaced relation about the outer periphery of said plate. The plate 28 is provided with a plurality of peripherally disposed flanged portions 30 which correspond in general to the flanged portions 29 of the plate 27. The flanged portions 29 and 30 of the plates 27 and 28, respectively, are adapted to interfit in such fashion that the valve member 26, when the plates 27 and 28 thereof are so assembled, will substantially completely fill the generally cylindrical chamber 25 formed between the couping boxes 11 and 12 when assembed together.

The plate 27 of valve member 26 is provided with a plurality of boss portions 31 projecting from that face of the plate 27 which is innermost when assembled with plate 28. The boss portions 31 are spaced about the plate 27 in the form of a circle adjacent to but within the outermost periphery of the plate 27 and are centrally apertured to provide the passageways 32 through the valve member 26 interconnecting the ports 19 and 20 of the coupling boxes 11 and 12, respectively when the boxes are coupled together. Boss portions 31 on plate 27 register with apertures 33 in the plate 28 and extend therethrough when the valve member 26 is assembled. It will be apparent that, by reason of this arrangement of the plates 27 and 28 of the valve member 26, the passageways 32 are coextensive through said valve member and thus prevent leakage between contiguous faces of said plates 27 and 28.

The passageways 32 directly connect with chambers 35 and 36 formed at the bases of the ports 19 and 20 in coupling boxes 11 and 12, respectively. The chambers 35 and 36 are provided with sealing assemblies 37 each of which includes a suitable O-ring seal 38, a seal guide 39 and a compression spring 40 disposed between the seal guide 39 and the base of the chamber adjacent to the port. These sealing assemblies serve not only to prevent leakage of the fluid being handled by the coupling unit 10 when the valve member is disposed in a position to interconnect the respective ports 19 and 20 of the valve boxes 11 and 12, but also to prevent leakage between the several chambers and the faces of the plates 27 and 28 when the valve member 26 is in closed position or when the coupling boxes are disconnected.

The plate 27 is also provided with a raised blank portion 41 on the innermost face thereof, which is adapted to register with a correspondingly shaped opening 42 extending through the plate 28, to assist in locating the parts of the coupling units when the ports 19 and 20 of boxes 11 and 12, respectively are to be interconnected. The plate 27 of the valve member 26 is provided with a knob 44 which is disposed centrally of said plate 27 with respect to the bosses 21 thereon and is held in place on the external face of the coupling box 11, as by means of a flat-headed bolt 45 which extends through a countersunk aperture in the innermost face of the plate 27 and loosely fitted through a hole 46 in the coupling box 11. The bolt 45 after being threaded into the knob 44 is secured in place as by means of a radially extending pin 47 (see Figure 2). A suitable anti-friction washer 48 is inserted between the flanged base of the knob 44 and the outer face of the coupling box 11 to permit the knob to be rotated freely with respect to said coupling box 11.

The knob 44 is provided at its flanged base with a pair of diametrically opposed pins 49 arranged on opposite sides of the bolt 45 which secures the knob 44 to the plate 27 of the valve member 26. The pins 49 which register with a pair of holes 50 in the plate 27 and are slidably disposed in a pair of slotted holes 51 in the coupling box 11 may be press fit into or formed integrally with the flanged base of knob 44.

The knob 44 is advantageously provided with a hexagonally shaped head portion to accommodate a wrench or similar tool by means of which it may be rotated about its axis so as to shift the plate 27 angularly through an arc restricted by the extremities of the slotted holes 51 in which the pins 49 which operate the plate 27 are movable. As will be readily understood from the following description of the operation of the coupling unit of the present invention, it is advantageous to provide for a shiftable movement of the plate 27 through an arc of approximately 15° so as to bring the passageways 32 of the boss portions 31 of the plate 27 into registration with the ports 19 in the coupling box 11 of the coupling unit 10. The plate 28 of the valve member 26 is rotatably mounted with respect to the coupling box 12 as by means of a bolt 53 extending through said plate 28 and the wall of the coupling box 12 and held in place thereon as by means of a nut 54.

It will thus be seen that the coupling box 11 and the plate 27 of the valve member 26 are adapted to form one of the detachable units of the coupling 10 while the coupling box 12 and its associated plate 28 of the valve member 26 forms the other unit thereof. When the aforementioned units are assembled together, it will be understood that the bosses 31 of plate 27 registering with the openings 33 of the plate 28 and the raised portion 41 on plate 27 registering with opening 42 in the plate 28 causes the latter to be rotated with the plate 27 so that the multi-part valve member 26 will be shifted as a unit as the knob 44 is turned. Thus, the passageways 32 will be readily interconnected with chambers 35 and 36 to join ports 19 and 20 in unrestricted fluid flow communication or the valve member 26 may be selectively adjusted to seal the ports and render the coupling capable of detachment.

The plate 28 of the valve member 26 is provided with an aperture 56 extending therethrough which is advantageously disposed in spaced relation with respect to the apertures 33 adjacent to the outer circumference of said plate 28. A suitable retaining means 57 is provided in coupling box 12 which comprises a generally cylindrical casing 58 having a substantially dome-shaped end portion 59. The casing 58 is backed by a compression spring 60 inserted therein and adapted to position the same with respect to the base of a bore 61 extending into the blank portion of one of the bosses 21 of said coupling box 12. The end portion 59 of the assembly is adapted to register disengageably with the aperture 56 in the plate 28 when the valve member 26 is disposed in such relation that the passageways 32 are in precisely interconnected relation to the ports 19 and 20 of the coupling boxes 11 and 12, respectively.

By virtue of its location with respect to the apertures 33 and, therefore, also with respect to the passageways 32 in the bosses 31 which register with said apertures 33, the retaining means 57 is capable of serving not only to prevent unauthorized or accidental movement of the valve member 26 but also as a position finder for the valve member 26 to indicate when the coupling boxes 11 and 12 of the coupling unit 10 are in locked relation and the ports 19 and 20 thereof are in direct fluid flow communication.

It will be readily understood, that the coupling unit 10 when in disassembled or disconnected relation, as illustrated by Figure 5 of the drawings, will correspond with the relationship of parts shown in Figures 7 and 8 of the drawings. In other words, the plate 27 of the valve member 26 will be retained and positioned by the coupling box 11 in such fashion that the flanged portions 29 disposed about the periphery of the plate 27 exactly coincide with and are engaged by the peripherally disposed fingers 24 of the coupling box 11. In like manner, the flanged portions 30 of the plate 28 are in exact registry with and retained by the fingers 24a of the coupling box 12.

In the positions indicated, the valve plate 27 will close the several ports 19 in the coupling box 11 and the sealing assemblies 37 will operate to prevent leakage from the chambers 35 in the coupling box 11 with respect to the face of the plate 27. Likewise, the plate 28 closes off the ports 20 in the coupling box 12 and serves to seal the chambers 36 in said coupling box with the sealing assemblies 37 disposed in said chambers preventing leakage therebetween. When the plate 28 is shifted to closed position in coupling box 12 so that the unit may be disconnected, the end portion 59 of retaining means 57 drops into the opening 42 in said plate. The movement of plate 28 is thus limited by the retaining means 57 to an extent sufficient to bleed the ports 20 and their associated conduits but insufficient to allow the several O-ring seals 38 from passing through the openings 33 in said plate.

When it is desired to couple the coupling boxes 11 and 12 of the coupling unit 10 together, the two boxes are placed adjacent to each other in such fashion that the several bosses 31 will register with the associated apertures 33 in the plate 28 and the raised portion 41 will mate with the opening 42 and in so doing force the end portion 59 of retaining means 57 out of engagement with said opening. In this relationship of the coupling boxes 11 and 12, the peripherally disposed fingers 24 and 24a of the coupling boxes 11 and 12, respectively, will interfit in the manner illustrated in Figure 1 of the drawings. After the parts have been placed in this relation, it is necessary only to turn the knob 44 causing the pins 49 to move in the elongated slots 51 whereby the valve member 26 is shifted angularly until the pins 49 have reached the opposite ends of the slots 51 at which point the end portion 59 of the retaining means 57 will drop into the aperture 56 in the plate 28.

This shifting of the valve member 26 causes the flanged portions 29 and 30 which, as will be recalled, were wholly retained in the respective fingers 24 and 24a of the coupling boxes 11 and 12 when the parts were in uncoupled relation, to be moved to a position such that they overlap the joint between the adjacent fingers 24 and 24a of the respective interfitted coupling boxes 11 and 12. The positions of the flanged portions 29 and 30 of the plates 27 and 28, respectively, with respect to their associated coupling boxes 11 and 12 will be apparent from Figures 3 and 4 of the drawings.

Thus, it will be seen that the flanged portions 29 and 30 will cause the fingers 24 and 24a of the coupling boxes 11 and 12 to be interlocked to prevent their disengagement until the knob 44 is again rotated in the opposite direction so as to cause said flanged portions 29 and 30 to assume their original positions wholly within their respective fingers 24 and 24a of the coupling boxes 11 and 12 so as to permit the coupling boxes to be disconnected. As long as the coupling boxes 11 and 12 are interfitted and locked together as by means of the flanged portions 29 and 30 of the plates 27 and 28, respectively, of the valve member 26, the passageways 32 of the bosses 31 associated with the plate 27 and extending through the plate 28 will be interconnected with the chambers 35 and 36 and their associated ports 19 and 20 for direct fluid flow communication.

The flanged portions 29 and 30 of the plates 27 and 28, respectively, may advantageously have their leading edges chamfered to aid in coupling the boxes 11 and 12 together when the knob 44 is turned. The structure of the coupling unit of the present invention is such that no great care is required to line up the plates when the two coupling boxes are connected. The coupling is, therefore, very easy to operate even when it is installed in an inaccessible position.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a coupling, a pair of ported coupling boxes, a member rotatably supported on each of said boxes for alternately covering and uncovering the ports in said box, one of said rotatable members having apertures therein and the other of said members having bosses defining passageways through said member and registering with the apertures in the first of said rotatable members, and means on said boxes cooperating with said rotatable members to lock the coupling boxes together when said members are rotated to bring the passageways into registry with the ports in said coupling boxes.

2. In a coupling, a pair of ported coupling boxes, each of said boxes having finger portions disposed in spaced relation about its periphery which cooperate with similar finger portions on the other of said boxes to form a generally cylindrical chamber therebetween, a valve member having a pair of mutually interfitting plates rotatably mounted in said cylindrical chamber, and means accessible externally of the boxes for rotating said valve member to open and close the ports in said coupling boxes and to lock the boxes together when rotated to port uncovering position.

3. In a coupling, a pair of ported coupling boxes, each of said coupling boxes having finger portions disposed in spaced relation about its periphery which cooperate with similar finger portions on the other of said boxes to form a generally cylindrical chamber therebetween, a valve member embodying a pair of interfitting apertured plates rotatably mounted in said chamber, means accessible externally of the boxes for rotating said valve member to open and close the ports in said coupling boxes and to lock the boxes together when rotated to port uncovering position, and means for restricting the extent of rotation of the valve member.

4. In a coupling, a pair of ported coupling boxes, each of said coupling boxes having finger portions disposed in spaced relation about its periphery which cooperate with similar finger portions on the other of said boxes to form a generally cylindrical chamber therebetween, a valve member having a pair of interfitting apertured members rotatably mounted in said cylindrical chamber, means for rotating said valve member to open and close the ports in said coupling boxes and to lock the same together when rotated to port uncovering position, and means in one of said coupling boxes for retaining the apertured member associated therewith in port uncovering relation against unauthorized rotation when the coupling boxes are coupled together with the ports thereof in unrestricted fluid flow communication.

5. A coupling for connecting conduits in fluid flow communication and for sealing the conduits in disconnected relation, comprising a pair of coupling boxes having ports in the mating end faces thereof, a valve plate rotatably mounted on each box to overlie the ported end face thereof for covering and uncovering the ports, a plurality of spaced fingers projecting axially from the peripheral portion of the end face of each box arranged to interfit between the fingers of the other box, spaced peripheral extensions on said valve plate adapted to underlie the fingers of the box on which the plate is mounted when the boxes are uncoupled, and means for rotating the valve plate to move the extensions of the valve plate on one box behind the fingers of the other box for coupling the boxes together while uncovering the ports of the boxes.

6. A coupling for connecting conduits in fluid flow communication and for sealing the conduits in disconnected relation comprising a pair of coupling boxes having ports in the mating end faces thereof, a fixed support projecting from the end face of each box, a valve plate rotatably mounted on each support to overlie the end face of the box for covering and uncovering the ports of the boxes, means connecting the valve plates for corotation when the boxes are positioned for coupling, and means accessible from the exterior of the boxes for rotating a support to rotate both plates for uncovering the ports.

7. A coupling comprising a pair of coupling boxes each of which is provided with a plurality of ports spaced from the center of the box and means for coupling said boxes together for interconnecting said ports, a valve member rotatably mounted on each of said coupling boxes for covering and uncovering the ports thereof, said valve member locking the coupling boxes together when the ports are uncovered, and means disposed centrally of and accessible from the exterior of one of the boxes for rotating the valve members in said boxes when the boxes are coupled together.

8. In a coupling, a pair of ported coupling boxes which shiftably support valve members for covering and uncovering the ports in said boxes, means on said coupling boxes cooperating with the valve members to connect the boxes together when said valve members are moved to port uncovering position, retaining means in at least one of the coupling boxes which coacts with its valve member to permit a restricted relative movement of said valve member with respect to its coupling box when said boxes are disconnected, and means associated with the other coupling box for removing the restraint of the retaining means from the valve member supported by the first mentioned coupling box when the boxes are assembled in connected relation.

9. In a coupling, a pair of ported coupling boxes which shiftably support valve members for covering and uncovering the ports in said boxes, means on said coupling boxes cooperating with the valve members to connect the boxes together when said valve members are moved to port uncovering position, spring pressed detent means in one of the coupling boxes, means in the valve member for disengageably receiving the spring pressed detent means to restrict the relative shifting of said valve member with respect to its coupling box when the coupling boxes are disconnected, and means on the valve member supported by the other coupling box for disengaging the spring pressed detent means from the receiving means in the valve member supported by the first-mentioned coupling box when the coupling boxes are assembled in coupled relation.

10. A detachable coupling comprising a pair of ported coupling boxes having mating fingers thereon, a pair of interfitting members shiftably supported in said mating fingers for covering the ports in the coupling boxes when said boxes are disconnected and uncovering said ports when said boxes are connected, detent means in a coupling box, a slotted opening in the interfitting member supported by the coupling box in which the detent means is disposed for disengageably receiving the detent means to permit limited shifting of said interfitting member with respect to its coupling box when the coupling boxes are uncoupled, and means on the other interfitting member for disengaging the detent means from the opening when the coupling boxes and their associated members are interfitted for coupling the boxes together.

11. In a detachable coupling having a pair of ported coupling boxes and a multi-part valve member shiftably supported by said coupling boxes for covering and uncovering said ports, one of said parts being supported in each box when the ports are covered and said boxes are uncoupled, restricting means comprising retaining means in at least one of said coupling boxes, means on one part of said valve member for disengageably receiving said retaining means to limit the relative movement of the valve part with respect to its box, and means on the other of said valve parts for moving the retaining means out of engagement with the receiving means when the coupling boxes and their respective valve parts are assembled in coupled relation.

12. A detachable coupling comprising a pair of ported coupling boxes, a member rotatably mounted in each coupling box for covering and uncovering the ports therein, means on the coupling boxes cooperating with said rotatably mounted members to couple said boxes together when said members are rotated to port uncovering position, a pair of apertures in one of the rotatably mounted members, detent means in the coupling box which supports the apertured rotatably mounted member for engagement with one of the apertures providing limited relative movement of the rotatably mounted member with respect to its box when the boxes are uncoupled, and means on the other of said rotatably mounted members for disengaging the detent means from the first mentioned aperture for engagement with the other aperture when the rotatably mounted members are interfitted and the coupling boxes are assembled in coupled relation.

13. In a coupling, a pair of ported coupling boxes, each of said boxes having finger portions disposed in spaced relation about its periphery which cooperate with similar finger portions on the other of said boxes to form a generally cylindrical chamber therebetween, a valve member having a pair of mutually interfitting plates rotatably mounted in said cylindrical chamber, means accessible externally of the boxes for rotating said valve member to open and close the ports in said coupling boxes and to lock the boxes together when rotated to port uncovering position, retaining means in one of said coupling boxes, a pair of receiving means in one of the plates of the valve member, one of which engages the retaining means when the coupling boxes are disassembled and provides limited shifting of the valve member with respect to its coupling box, and means on the other plate for disengaging the retaining means from the receiving means for engagement with the other of said receiving means when the coupling boxes are coupled together.

14. In a coupling, a pair of ported coupling boxes, a valve member rotatably mounted between said coupling boxes for opening and closing the ports therein, said valve member embodying a pair of apertured plates each mounted on one of the boxes and having a plurality of peripheral flanged portions interfitting with corresponding peripheral flanged portions in the other plate, one of said plates having bosses defining passageways through said valve member and interfitting with the apertures in the other plate, supporting means on each of said boxes for engaging the plates of said valve member, and means for rotating said valve member to bring the passageways extending therethrough into registration with the ports in each of said coupling boxes and to shift the peripheral flanged portions of the valve plate associated with each of the boxes into at least partial engagement with the supporting means of the other of said boxes to lock the boxes together.

NORMAN E. WAAG.